(12) United States Patent
Meeks et al.

(10) Patent No.: US 8,382,082 B2
(45) Date of Patent: Feb. 26, 2013

(54) METHOD AND APPARATUS FOR HORIZONTAL ASSEMBLY OF A HIGH-VOLTAGE FEED-THROUGH BUSHING

(75) Inventors: Daniel Gath Meeks, Imperial Beach, CA (US); Wendy Marie Massey, La Jolla, CA (US); William George Cheyne, Tucson, AZ (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 244 days.

(21) Appl. No.: 12/839,562

(22) Filed: Jul. 20, 2010

(65) Prior Publication Data
US 2010/0281675 A1 Nov. 11, 2010

Related U.S. Application Data

(62) Division of application No. 11/292,175, filed on Dec. 1, 2005, now Pat. No. 7,798,479.

(51) Int. Cl.
*B23P 11/00* (2006.01)

(52) U.S. Cl. ............................................ 269/17; 29/559

(58) Field of Classification Search .................. 29/281.1, 29/559, 455.1; 269/329, 17, 55; 174/142, 174/137 R, 155
See application file for complete search history.

(56) References Cited

U.S. PATENT DOCUMENTS

| | | | |
|---|---|---|---|
| 6,170,141 B1 * | 1/2001 | Rossway et al. | 29/281.1 |
| 6,173,947 B1 * | 1/2001 | Johnson | 269/17 |
| 6,292,999 B1 * | 9/2001 | Rossway et al. | 29/559 |
| 6,298,536 B1 * | 10/2001 | Rossway et al. | 29/281.1 |
| 7,377,502 B2 * | 5/2008 | Nikolic | 269/17 |
| 7,448,606 B1 * | 11/2008 | Johnson | 269/17 |

* cited by examiner

*Primary Examiner* — Lee D Wilson
(74) *Attorney, Agent, or Firm* — Kyle Eppele; Peter A. Lipovsky; Andrew J. Cameron

(57) ABSTRACT

A method for horizontal assembly of a high-voltage feed-through bushing includes vertically-assembling a field shaper assembly of a high-voltage feed-through bushing on a field shaper fixture. The field shaper assembly is then rotated within the field shaper fixture such that the field shaper assembly is oriented on a horizontal axis. Next, an insulator tube fixture supporting an insulator tube assembly is positioned adjacent to the field shaper fixture. The insulator tube assembly, being oriented on the same horizontal axis as the field shaper assembly, is then affixed to field shaper assembly.

8 Claims, 10 Drawing Sheets

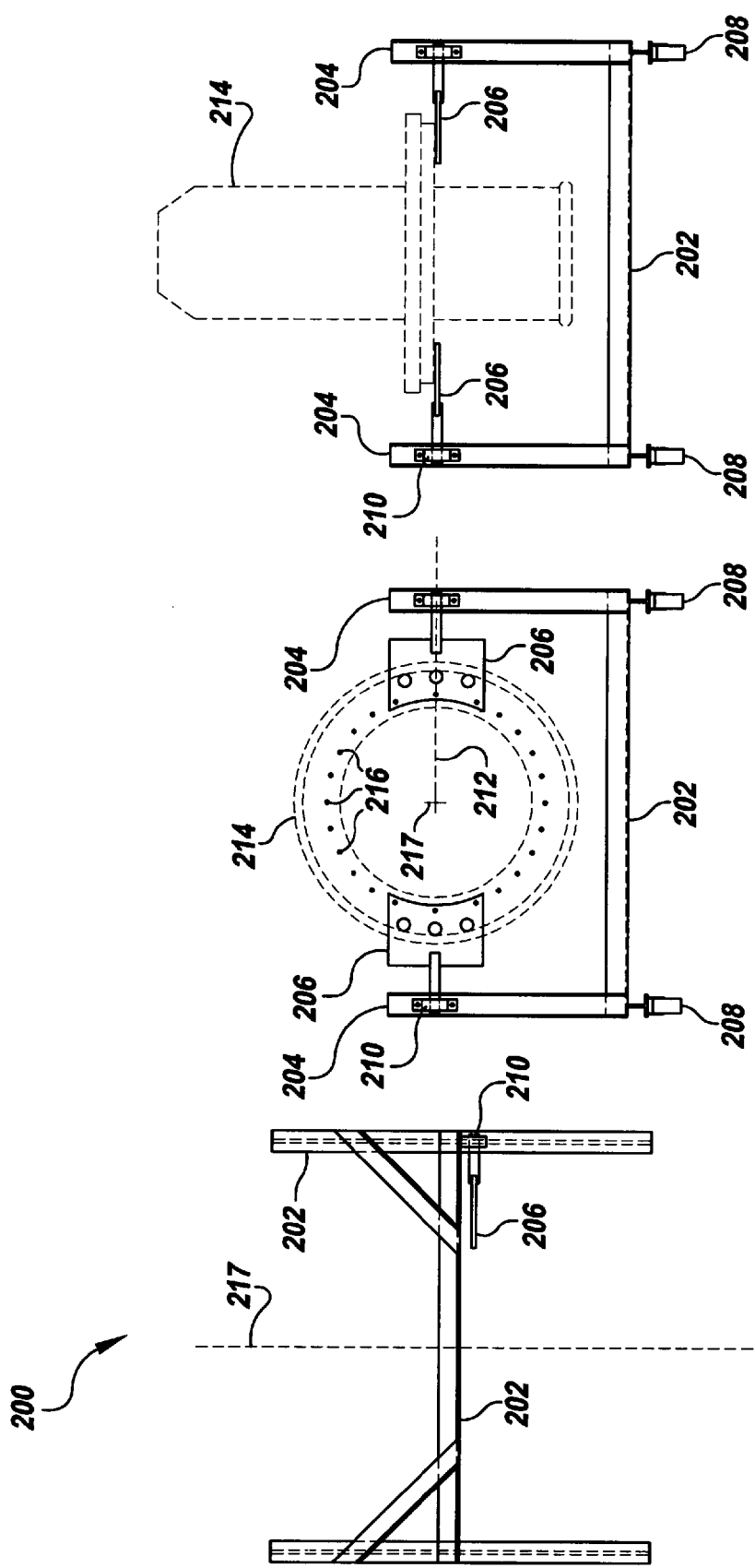

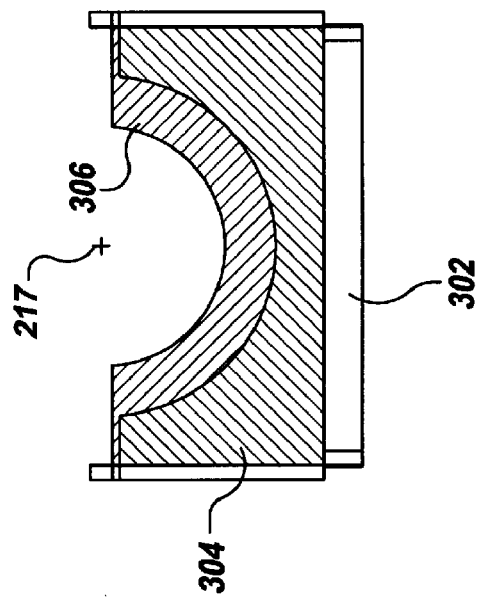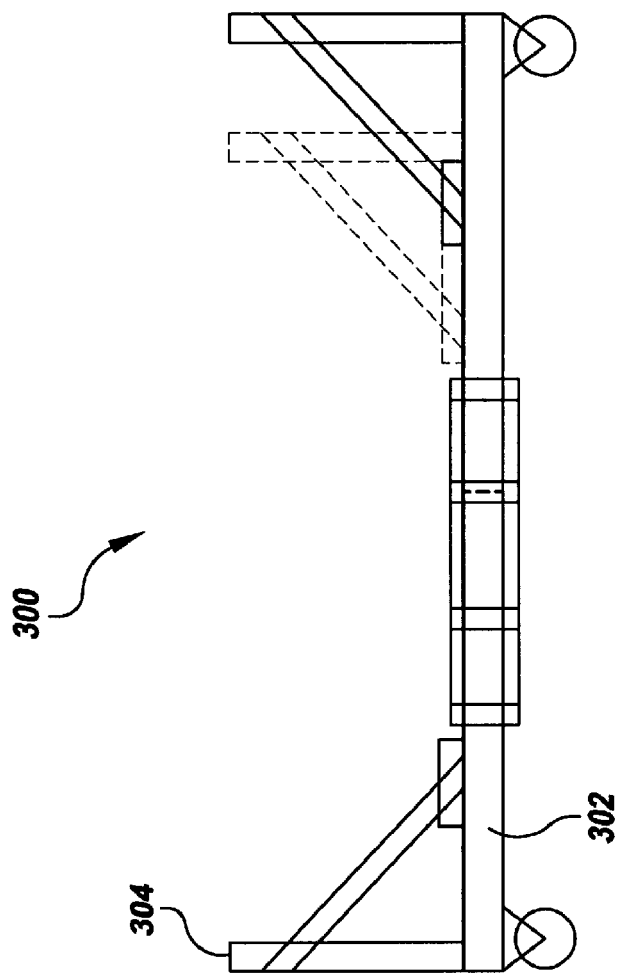

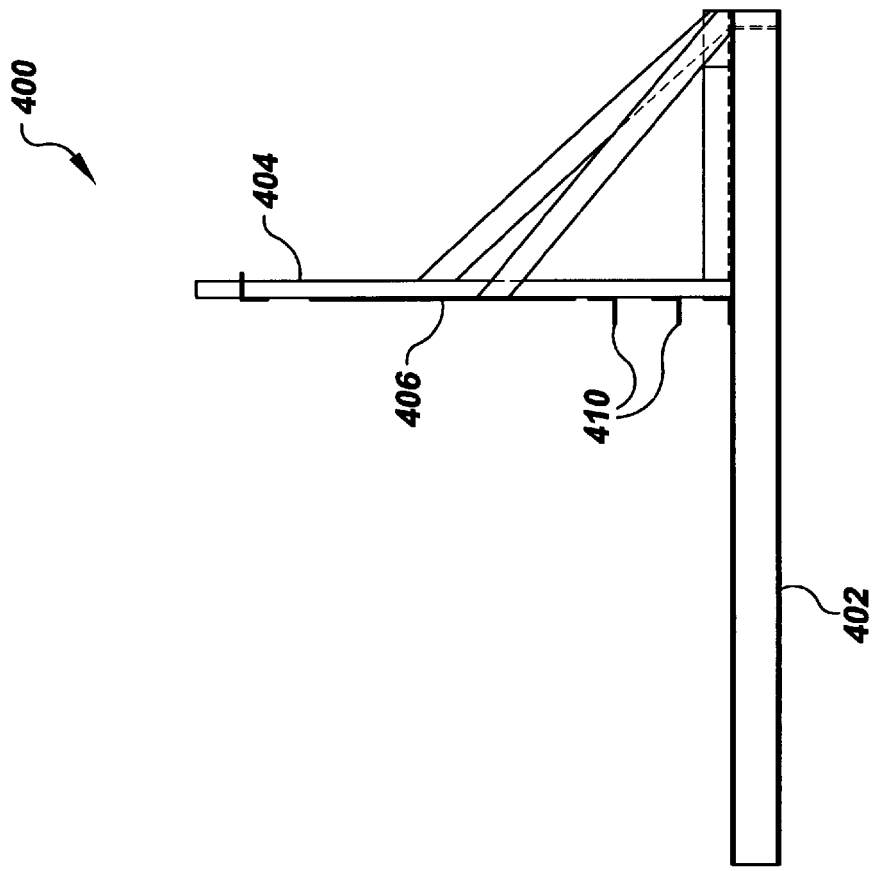
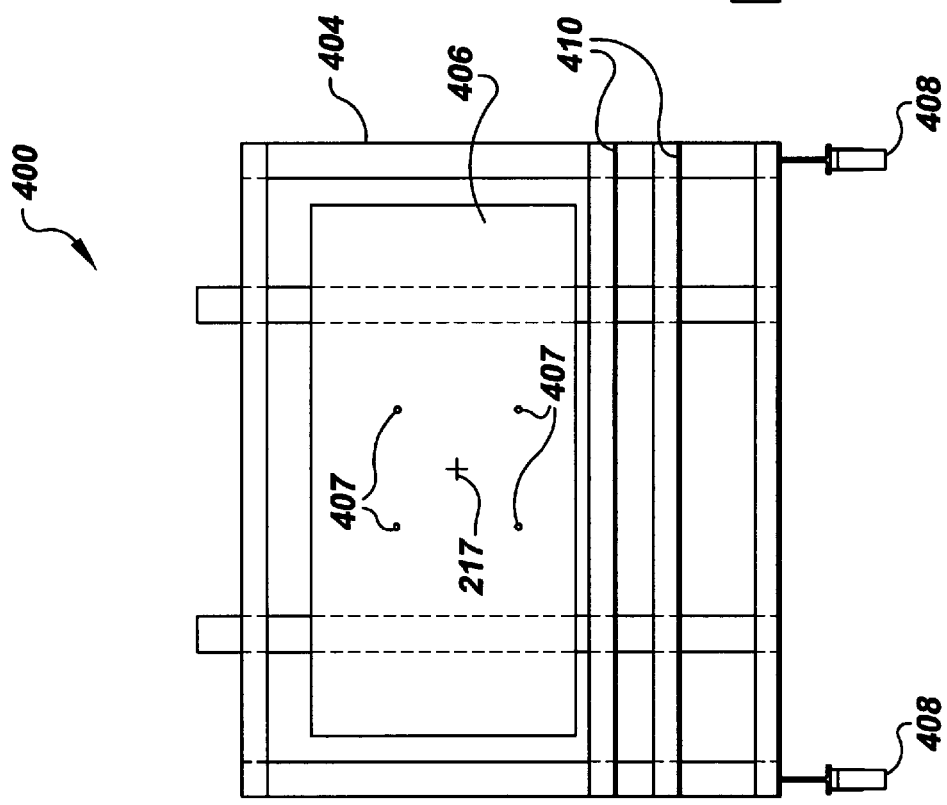

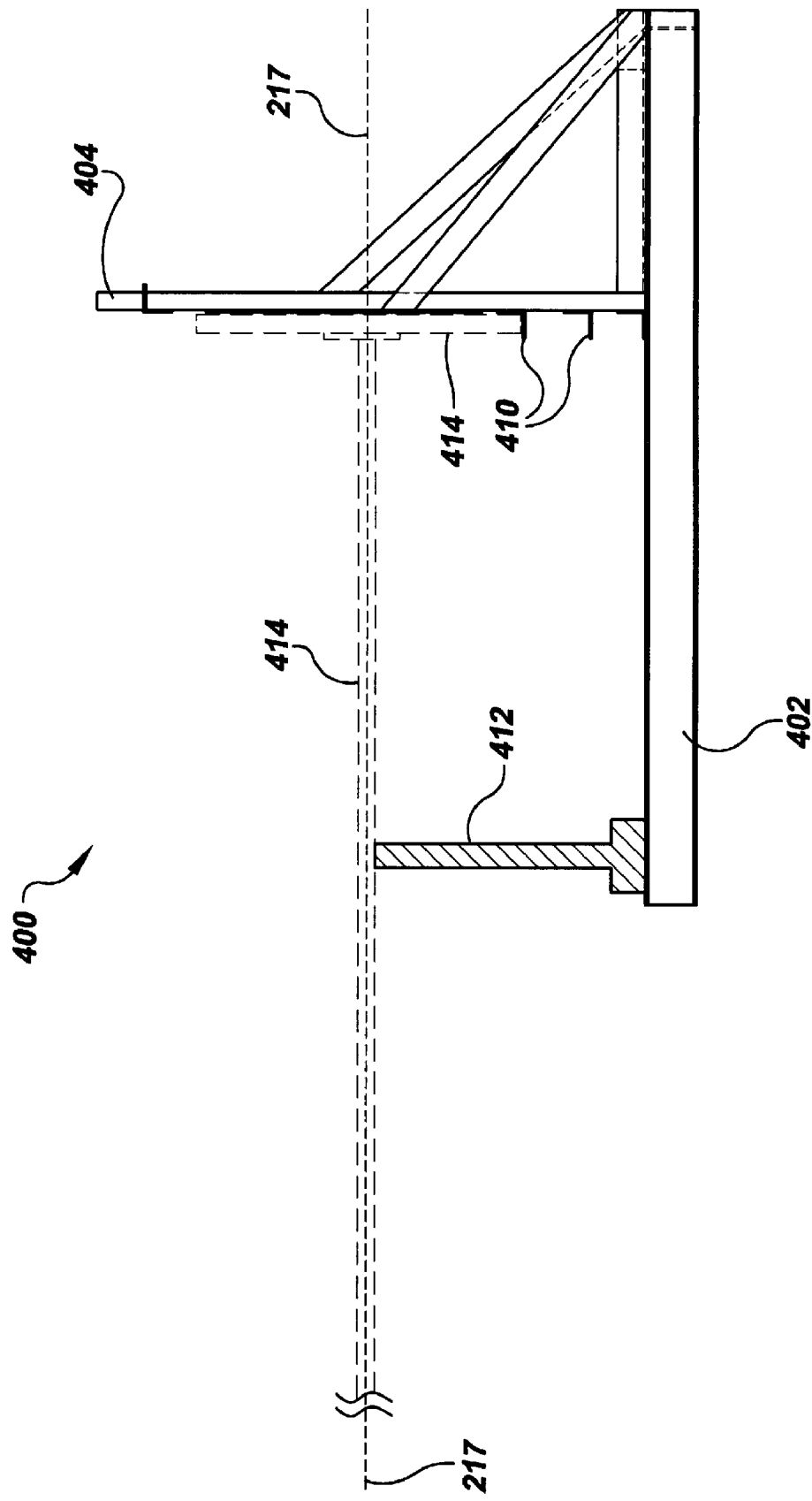

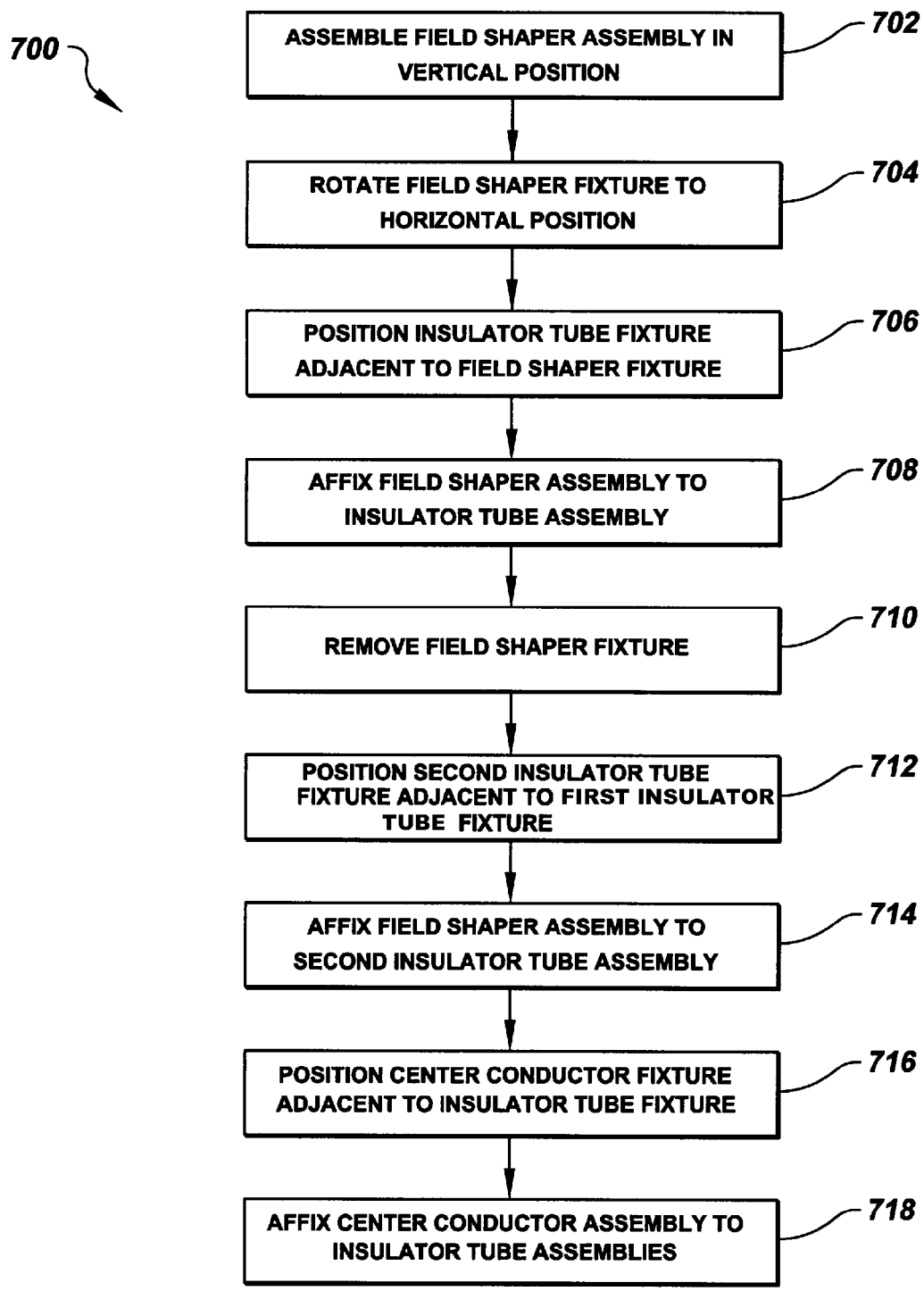

METHOD AND APPARATUS FOR HORIZONTAL ASSEMBLY OF A HIGH-VOLTAGE FEED-THROUGH BUSHING

CROSS-REFERENCE TO RELATED APPLICATION

This application is a divisional of U.S. patent application Ser. No. 11/292,175 filed 1 Dec. 2005 and now U.S. Pat. No. 7,798,479 issued 21 Sep. 2010.

FEDERALLY-SPONSORED RESEARCH AND DEVELOPMENT

The Method and Apparatus for Horizontal Assembly of a High-Voltage Feed-Through Bushing is assigned to the United States Government and is available for licensing for commercial purposes. Licensing and technical inquiries should be directed to the Office of Patent Counsel, Space and Naval Warfare Systems Center, San Diego, Code 20012, San Diego, Calif., 92152; telephone (619)553-3001, facsimile (619)553-3821.

TECHNICAL FIELD

The Method and Apparatus for Horizontal Assembly of a High-Voltage Feed-Through Bushing generally relates to assembly fixtures and in particular but not exclusively, relates to assembly fixtures for high-voltage bushings.

BACKGROUND

Most high voltage bushings have one dielectric tube external to a building or container. Feed-through bushings that exit from a building often have a second dielectric tube internal to the building. The tubes are usually joined together by a coupling where the bushing passes through the building. Often the tubes are sealed and pressurized with air, nitrogen (N2) or sulfur hexaflouride (SF6) to increase the withstand voltage between a high voltage center conductor mounted in the bushing and the ground potential at the point where they penetrate the building. The dielectric tubes are most commonly made out of fiberglass covered with silicone rubber materials. Recently, these bushings have included internal field shapers for moderating the electric field along the bushing. U.S. Pat. No. 6,951,987, entitled, "High Voltage Bushing" describes an exemplary embodiment of a bushing utilizing an internal field shaper.

High-voltage feed-through bushings typically weigh thousands of pounds and may be up to twenty feet in length. Typically, these bushings are assembled vertically. Vertical assembly of these high-voltage feed-through bushings presents a number of problems. First, assembling the bushing outdoors could result in physical dangers to personnel and damage to equipment as a result of inclement wind and weather. Second, assembly outdoors presents a greater risk of contamination within the interior of the bushing. Third, assembling the bushing indoors requires very tall facilities. Fourth, expensive and heavy-duty over-head hoists or cranes are required for vertical assembly of bushings. Fifth, alignment with vertical assembly can be difficult and hazardous because of the need for an individual to be present at the height of assembly.

The process of assembling a high-voltage feed-through bushing should be relatively safe and inexpensive, should minimize the chance of contamination of the interior of the bushing, and should not require specialized facilities.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 2A is a top view of a field shaper fixture, in accordance with an embodiment of the invention.

FIG. 2B is a front view of a field shaper fixture, in accordance with an embodiment of the invention, coupled to a field shaper assembly in a horizontal position.

FIG. 2C is a front view of a field shaper fixture, in accordance with an embodiment of the invention, coupled to a field shaper assembly in a vertical position.

FIG. 3A is a side view of an insulator tube fixture, in accordance with an embodiment of the invention.

FIG. 3B is a front view of an insulator tube fixture, in accordance with an embodiment of the invention.

FIG. 4A is a front view of a center conductor fixture, in accordance with an embodiment of the invention.

FIG. 4B is a side view of a center conductor fixture, in accordance with an embodiment of the invention.

FIG. 4C is a side view of a center conductor fixture, in accordance with an embodiment of the invention, coupled to a center conductor assembly.

FIG. 7 is a flow-chart illustrating a process of assembling a high-voltage feed-through bushing, in accordance with an embodiment of the invention.

DETAILED DESCRIPTION

Embodiments of a Method and Apparatus for Horizontal Assembly of a High-Voltage Feed-Through Bushing are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
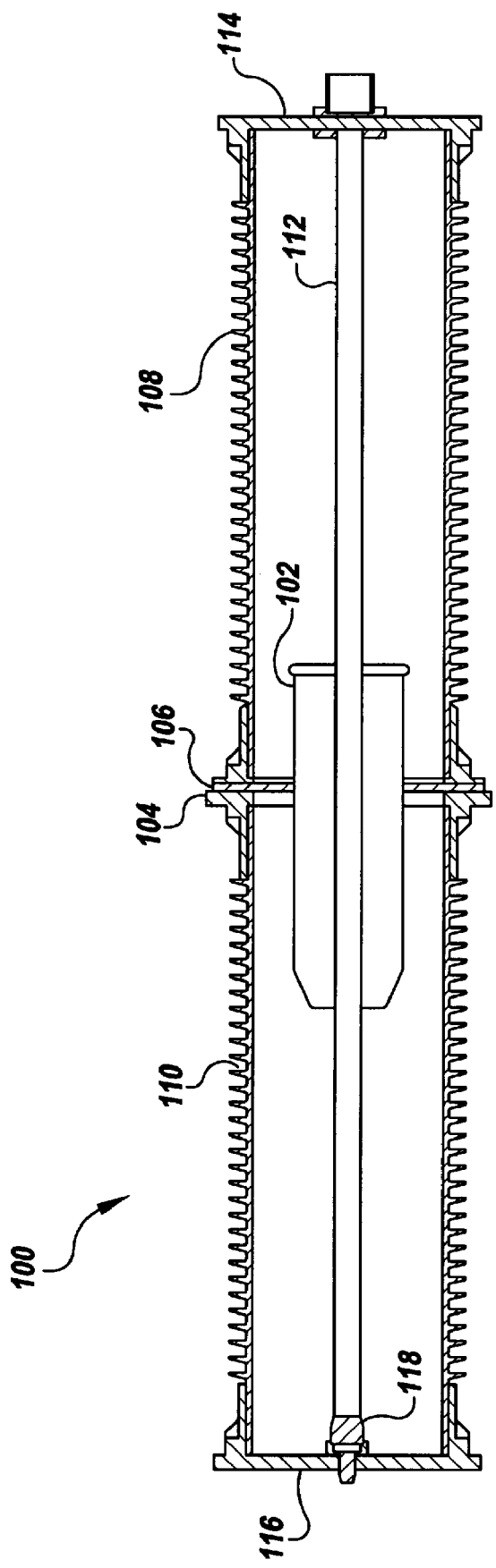
FIG. 1 is a cross-sectional view of a high-voltage feed-through bushing.

FIG. 1 is a cross-sectional view of a high-voltage feed-through bushing 100. The illustrated application of bushing 100 includes field shaper 102, center plate 104, intermediate plate 106, insulator tubes 108 and 110, center conductor 112, end plates 114 and 116, and socket 118. The term "field shaper assembly" as used herein is intended to refer to an assembled structure that includes, at least, field shaper 102, center plate 104, and intermediate plate 106. The term "center conductor assembly" as used herein is intended to refer to an assembled structure that includes, at least, center conductor 112 and end plate 114. The term "insulator tube assembly" as used herein is intended to refer to an assembled structure that includes, at least, insulator tube 108 or insulator tube 110.

FIGS. 2A, 2B, and 2C illustrate various views of a field shaper fixture 200, in accordance with an embodiment of the invention. The illustrated embodiment of field shaper fixture 200 includes base 202, vertical support members 204, mounting paddles 206, wheels 208, and rotating joints 210. FIG. 2A illustrates a top view of field shaper fixture 200, in accordance with an embodiment of the invention. FIG. 2B illustrates a front view of field shaper fixture 200 with field shaper assembly 214 in a horizontal position (aligned along horizontal axis 217), in accordance with an embodiment of the invention. FIG. 2C illustrates a front view of field shaper fixture 200 with field shaper assembly 214 in a vertical position, in accordance with an embodiment of the invention.

The support stand of the illustrated embodiment of field shaper fixture 200 includes base 202, two vertical upright members 204 and wheels 208. In one embodiment, four wheels 208 may be attached to base 202, one on each corner of base 202. Various numbers and configurations of wheels may be implemented in conjunction with base 202, such that field shaper fixture 200 is capable of being positioned in various locations for assembly of bushing 100.

By way of example, base 202 may be built with 2ea 4"×2.66"×0.190"×48"L aluminum I-beams set 55" apart with a 2½"×2½"×¼" aluminum cross member angle bolted to the I-beam at the centerline. 4ea 4" casters may also be attached to the bottom of the I-beams at the outside corners. In addition, 2ea ½"×2" aluminum flat bar braces may be attached at angle from the cross member angle to the top of the I-beams on both sides.

In one embodiment, vertical support members 204 may be built with 2ea 3"×1.41"×0.170"×30"L aluminum channel pieces attached to the cross member angle and perpendicular to the I-beam on either side. 2ea ½"×2" aluminum flat bar braces may also be attached to the edge of the channel at angle to a bracket on the top of the I-beam on both sides.

The illustrated embodiment of field shaper 200 further includes two mounting paddles 206. Mounting paddles 206 are adapted for coupling to a field shaper assembly of bushing 100 and are capable of rotating about horizontal axis 212. Mounting paddle 206 is coupled to vertical upright member 204 by way of mounting joint 210. In one embodiment, mounting joint 210 may include a pillow block bearing assembly. Pillow block bearing assembly may be secured to slotted holes in vertical upright member 204 to allow for height adjustments of mounting paddle 206.

Figure 2D:
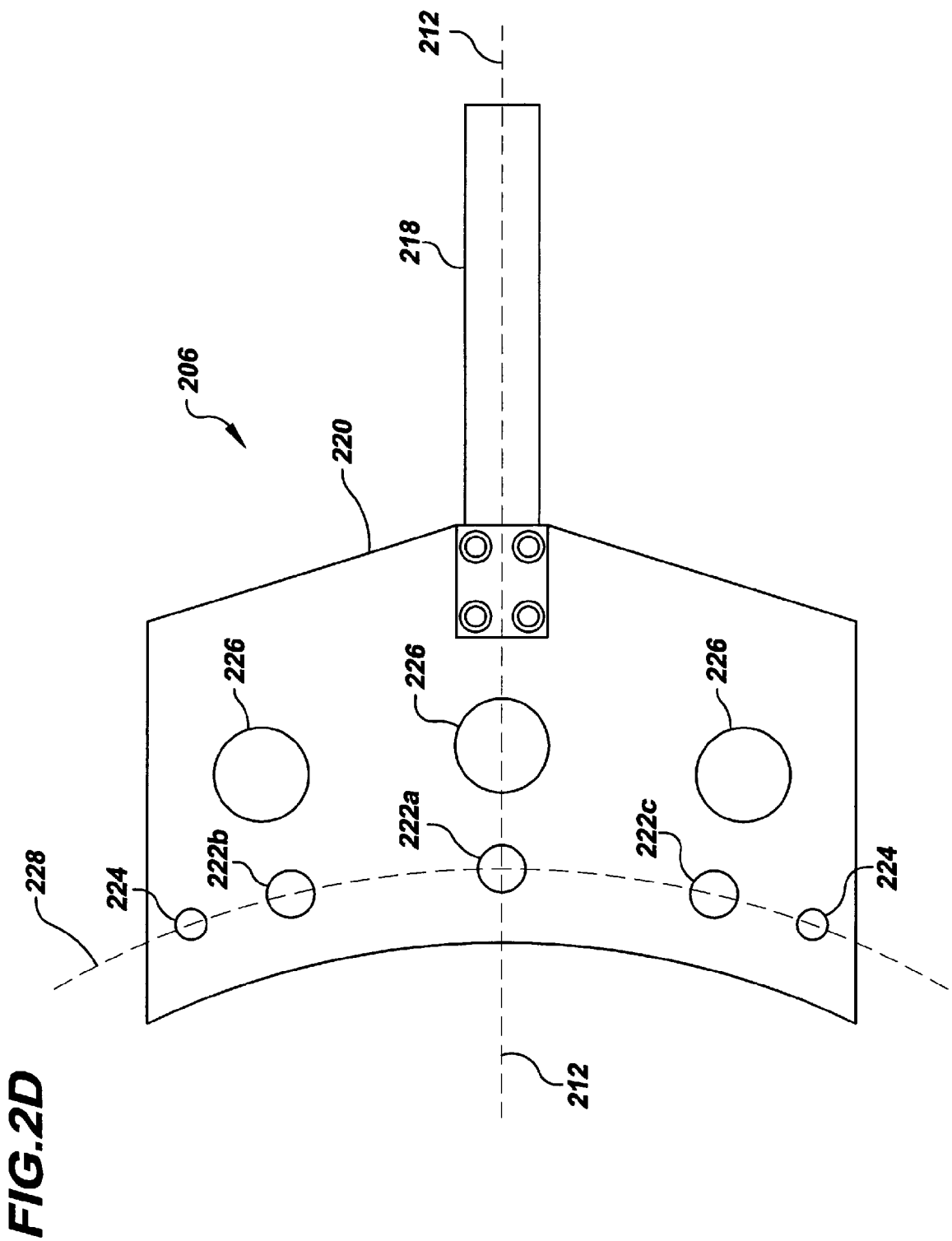
FIG. 2D is a top view of a mounting paddle, in accordance with an embodiment of the invention.

FIG. 2D illustrates one embodiment of mounting paddle 206 in more detail. Mounting paddle 206 includes a shaft 218 and a mounting plate 220. One end of shaft 218 is coupled to mounting joint 210. In one embodiment, shaft 218 may be coupled to mounting joint 210 such that mounting paddle 206 is capable of being adjusted linearly along horizontal axis 212. Shaft 218 may also include a locking plate to allow mounting paddle 206 to be locked into either a vertical or a horizontal position.

A second end of shaft 218 is coupled to mounting plate 220. Mounting plate 220 is adapted to allow the mounting plate to be temporarily secured to field shaper assembly 214. The illustrated embodiment of mounting plate 220 includes a concave edge opposite shaft 218, but it is recognized that various edge shapes may be implemented to provide clearance for field shaper assembly 214.

Also included in mounting plate 220 are mounting apertures 222(a)-(c). In one embodiment, mounting apertures 222(a)-(c) may be through-holes for allowing plate 220 to be temporarily bolted to field shaper mounting holes 216, as shown in FIG. 2B. In addition, mounting apertures 222(a)-(c) are disposed on an arc 228 that is defined by the circumference of field shaper mounting holes 216. In one embodiment, mounting plate 220 may include additional mounting apertures 224. Mounting apertures 224 may be used in conjunction with mounting aperture 222a for securing mounting plate 220 to a different field shaper assembly with a second diameter.

Mounting plate 220 may also include clearance apertures 226. Assembling field shaper assembly 214 may require bolting center plate 104 to intermediate plate 106. Clearance apertures 226 are for allowing access to these assembly bolts of field shaper assembly 214.

Figure 3C:
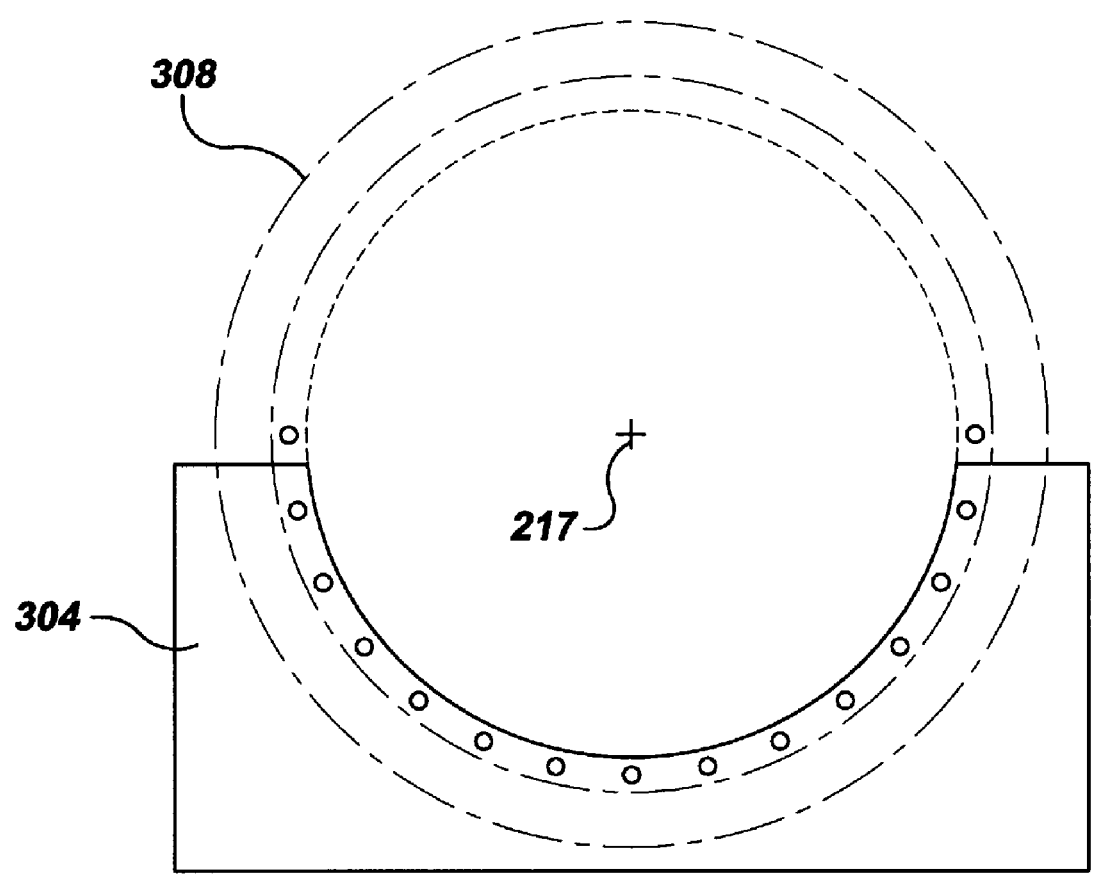
FIG. 3C is a front view of an insulator tube fixture, in accordance with an embodiment of the invention, supporting an insulator tube assembly.

FIGS. 3A, 3B, and 3C illustrate various views of an insulator tube fixture 300, in accordance with an embodiment of the invention. The illustrated embodiment of insulator tube fixture 300 includes base 302 and resting cradle 304. FIG. 3A illustrates a side view of insulator tube fixture 300, in accordance with an embodiment of the invention. FIG. 3B illustrates a front view of insulator tube fixture 300. FIG. 3C illustrates a front view of resting cradle 304 supporting an insulator tube assembly 308 in a horizontal position (aligned along horizontal axis 217).

By way of example, insulator tube fixture 300 may be constructed of 2ea 4"×2.66"×0.190"×37.5"L and 2ea 4"×2.66"×0.190"×49.5" aluminum I-beams for adjustable side rails 48" apart. 2ea adjustment support structures consisting of 2ea 3"×1.41"×0.170"×36" aluminum channel pieces and 8ea ½"×2"×7"L aluminum flat bar are attached to I-beam side rails to allow for length adjustment of insulator tube fixture 300 to fit insulator tube assemblies of various lengths. A support channel may be attached to the top and bottom of each side rail with aluminum flat bar parts attached vertically to outside edges of the channel at both ends and spaced through middle of length. I-beams and channel pieces are both machined with attaching holes for length adjustment. 2ea 4"×2.66"×0.190"×42⅝"L aluminum I-beams may be attached with brackets to both ends of the side rail I-beams. 2ea 2½"×2½"×¼"×8"L aluminum angle pieces are attached at either end to help support radius end plates 114 and 116. 2ea 3"×1.41"×0.170"×24"L aluminum channel pieces are attached vertically to an angle cross brace at each end of insulator tube fixture 300. 4ea ½"×2" aluminum flat bar braces are attached at angle from the upright channel to top of I-beam side rails at all 4 corners. 4ea 6" heavy-duty casters may be mounted at outside corners to allow insulator tube assembly 300 to be easily moved for assembling bushings 100. Resting cradles 304 and 306 may be fabricated as plywood inserts, 2ea per cart/fixture. Resting cradle 304 is made to facilitate one bushing size and resting cradle 306 is made to facilitate a second bushing 100 size. By way of example, for a 24" bushing, resting cradles 304 may be made from a minimum ¾" plywood, 47.5"W×22"H and with a 12.5" radius cut at the center dimensions of 23.75"×23". For a 30" bushing resting cradle 306 may be made from a minimum ¾" plywood 47.5"W×21.5"H and with a 17.25 radius cut at the center dimensions of 23.75"×23". The dimensions for the radius center are calculated to locate the centerline of the insulator tube assembly 308 with horizontal axis 217.

FIGS. 4A, 4B, and 4C illustrate various views of a center conductor fixture 400, in accordance with an embodiment of the invention. The illustrated embodiment of center conductor fixture 400 includes base 402, vertical upright member 404, vertical upright backplate 406, mounting holes 407, wheels 408, and support shelf 410. FIG. 4A illustrates a front view of center conductor fixture 400, in accordance with an embodiment of the invention. FIG. 4B illustrates a side view of center conductor fixture 400, in accordance with an embodiment of the invention. FIG. 4C illustrates a side view of center conductor fixture 400 with a center conductor assembly 414 in a horizontal position (aligned along horizontal axis 217).

The support stand of the illustrated embodiment of center conductor fixture 400 includes base 402, vertical upright member 404, vertical upright backplate 406, and wheels 408.

By way of example, base 402 may be constructed of 2ea 4"×2.66"×0.190"×72"L aluminum I-beams set 55" apart with a 4"×2.66"×0.190"×49.625"L I-beam bolted with brackets to one end. A 2½"×2½"×¼" aluminum angle bolted 24" from same end, both cross braces to maintain 55" width to allow clearance for insulator tube fixture 300.

In one embodiment, vertical support member 404 may be built with 2ea 3"×1.41"×0.170"×30"L aluminum channel pieces attached to the angle cross member perpendicular to the I-beam on either side. 2ea ½"×2" aluminum flat bar braces are attached to the channel at angle to the top of the I-beam cross member at rear of fixture. 2ea 3"×1.41"×0.190"×34"L aluminum channel pieces are attached vertically to the angle cross member 34" apart with 2½"×2½"×¼" aluminum angle braces bolted horizontally to side of channel and rear cross brace I-beam. 2ea 2½"×2½"×¼" aluminum angle braces are attached to the channel at angle to the top of the I-beam cross member. A 2½"×2½"×¼" aluminum angle piece may be machined for attachment to 4ea aluminum channel uprights at the top of the 30" channel.

Support shelf 410 may be constructed from a 2½"×2½"×¼"×55"L aluminum angle piece and mounted horizontally across the channel uprights for supporting endplate 114 of center conductor assembly 414. The channel uprights may be drilled for adjustable height attachment of support shelf 410 such that the centerline of center conductor assembly 414 is aligned with horizontal axis 217.

Vertical upright backplate 406 may be fabricated from a ⅜"×18"×48" aluminum plate machined with mounting holes 407 and attached to the channel uprights on vertical upright member 404. 4" casters may be attached to the bottom outside corners of base 402 to allow center conductor fixture 400 and a center conductor assembly 414 to be easily positioned for assembly into an insulator tube assembly 408.

In the illustrated embodiment of FIG. 4C, center conductor fixture 400 includes a center conductor support 412. Center conductor support 412 is for providing temporary support to center conductor 112 during assembly of bushing 100. Center conductor support 412 may include 2ea wood 2×4's 5 feet long and 1ea 2×4×22.5" long attached perpendicular to and at the center of the five foot boards with one on each side.

In addition, a weight may be placed on the back of the fixture to help counterbalance the weight of center conductor assembly 414. By way of example, a twenty-five pound lead weight may be utilized.

Figure 5:
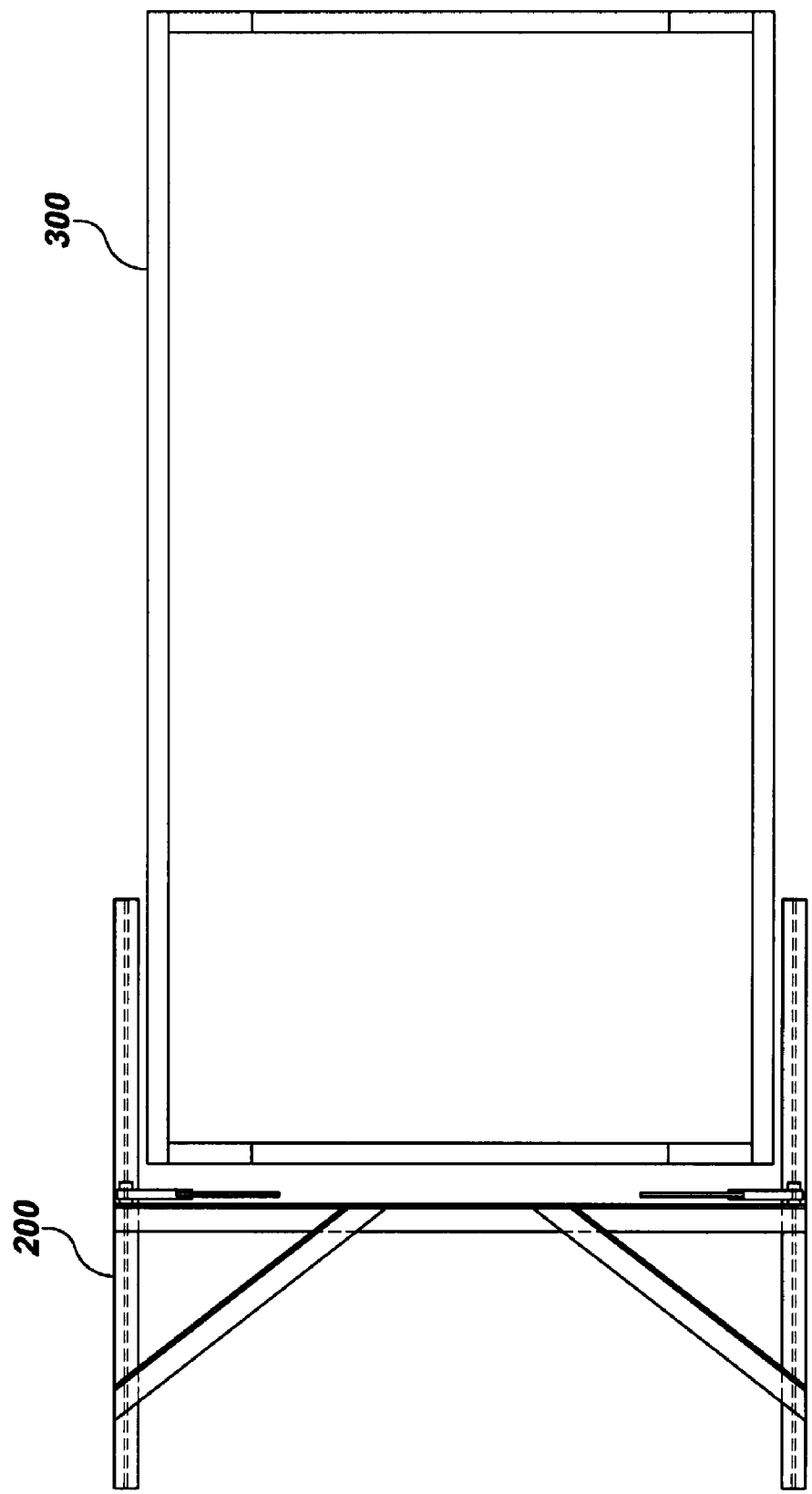
FIG. 5 is a top view of a field shaper fixture positioned adjacent to an insulator tube fixture, in accordance with an embodiment of the invention.
Figure 6:
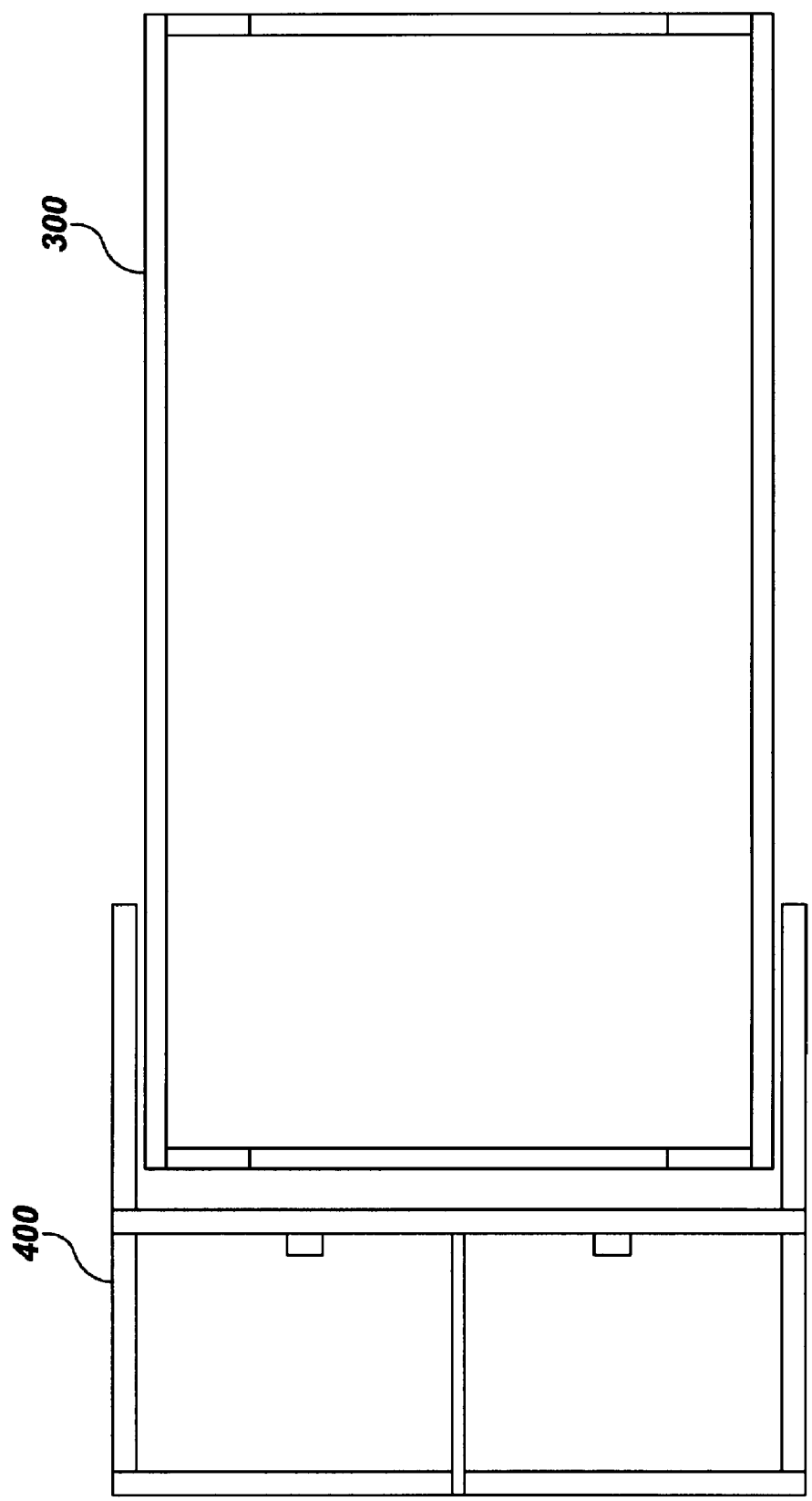
FIG. 6 is a top view of a center conductor fixture positioned adjacent to an insulator tube fixture, in accordance with an embodiment of the invention.

FIG. 5 is a top view of field shaper fixture 200 positioned adjacent to insulator tube fixture 300, in accordance with an embodiment of the invention. FIG. 6 is a top view of center conductor fixture 400 positioned adjacent to insulator tube fixture 300, in accordance with an embodiment of the invention. As mentioned previously, the corresponding widths of field shaper fixture 200, insulator tube fixture 300, and center conductor fixture 400 are such that the fixtures may be positioned adjacent to one another for horizontal assembly of bushing 100.

FIG. 7 is a flow chart illustrating a process 700 for horizontal assembly of a high-voltage feed-through bushing, in accordance with an embodiment of the invention. Process 700 is described with reference to FIGS. 1-7.

In process block 702, field shaper assembly 214 is assembled in a vertical position. First, field shaper fixture 200 is locked into a vertical build position. The vertical build position includes the mounting plates 220 of mounting paddles 206 oriented substantially horizontal. Next, intermediate plate 106 is temporarily bolted to mounting paddles 206 via mounting apertures 222(a)-(c). Field shaper 102 is then placed into intermediate plate 106. Center plate 104, with an o-ring, is then place over field shaper 102 and bolted to intermediate plate 106 utilizing clearance apertures 226 where necessary.

In process block 704, field shaper fixture 200 is unlocked from its vertical build position and field shaper assembly 214 is rotated about axis 212 such that field shaper fixture is locked into a horizontal build position. The horizontal build position includes field shaper assembly 214 being aligned along horizontal axis 217. Alignment pins are then inserted into center plate 104.

In process block 706, insulator tube fixture 300, supporting insulator tube assembly 308 with o-rings on both ends, is positioned adjacent to field shaper fixture 200, as shown in FIG. 5, using the alignment pins as a guide.

In process block 708, the insulator tube assembly 308 and field shaper assembly 214, both being aligned on horizontal axis 217, are affixed to one another via multiple bolts. The alignment pins are then removed from center plate 104.

In process block 710, the temporary bolts securing field shaper assembly 214 to mounting paddles 206 are removed. Next, field shaper fixture 200 is removed, leaving field shaper assembly 214 and insulator tube assembly 308 supported by insulator tube assembly 308. Alignment pins are then inserted into intermediate plate 106.

In process block 712, a second insulator tube assembly 308, with o-rings on both ends, supported by a second insulator tube assembly 300 is positioned adjacent to field shaper assembly 214, such that the second insulator tube assembly 308 is oriented along horizontal axis 217, using the alignment pins in intermediate plate 106 as a guide.

In process block 714, the second insulator tube assembly 300 is affixed to field shaper assembly 214 via multiple bolts and the alignment pins are removed from intermediate plate 106.

In process block 716, end plate 114 is temporarily bolted to vertical upright backplate 406 of center conductor fixture 400, via mounting holes 407. Next, center conductor 112 is bolted horizontally to end plate 114, while temporarily being supported by center conductor support 412. Next, a 4" diameter PVC pipe is inserted through both insulator tube assemblies 308 and field shaper assembly 214. Alignment pins are then inserted into end plate 114 and center conductor fixture 400 is positioned adjacent to one of the insulator tube assemblies 308, until center conductor 112 is inserted into the PVC pipe for support. Next, center conductor support 412 is removed and center conductor fixture 400 is positioned, as shown in FIG. 6, using the alignment pins in end plate 114 as a guide.

In process block 718, insulator tube assembly 300 is affixed to center conductor assembly 414 via multiple bolts and the alignment pins are removed from end plate 114. Next, center conductor assembly 414 is detached from center conductor fixture 400 and center conductor fixture 400 is removed.

Lastly, the PVC pipe support is removed from center conductor 112. Endplate 116 with socket 118 is then bolted to the second insulator tube assembly 308, utilizing temporary alignment pins inserted into endplate 116.

We claim:

1. A method comprising:
   vertically-assembling a field shaper assembly of a high-voltage feed-through bushing on a field shaper fixture;
   rotating said field shaper assembly within said field shaper fixture, such that said field shaper assembly is oriented substantially on a horizontal axis;
   positioning a first insulator tube fixture adjacent to said field shaper fixture, said first insulator tube fixture supporting a first insulator tube assembly oriented substantially on said horizontal axis; and
   affixing said field shaper assembly to said first insulator tube assembly.

2. The method of claim 1, further comprising:
   removing said field shaper fixture from said field shaper assembly, such that said first insulator tube fixture supports both said insulator tube assembly and said field shaper assembly;
   positioning a second insulator tube fixture adjacent to said first insulator tube fixture, said second insulator tube fixture supporting a second insulator tube assembly oriented substantially on said horizontal axis; and
   affixing said field shaper assembly to said second insulator tube assembly.

3. The method of claim 2, wherein said positioning further includes relocating at least one of said fixtures with respect to another said fixture.

4. The method of claim 2, further comprising:
   positioning a center conductor fixture adjacent to one of said insulator fixtures, said center conductor fixture supporting a center conductor assembly oriented substantially on said horizontal axis; and
   affixing said center conductor assembly to at least one of said insulator tube assemblies.

5. The method of claim 4, wherein said positioning further includes relocating at least one of said fixtures with respect to another of said fixtures.

6. The method of claim 1, wherein said positioning further includes relocating at least one of said fixtures with respect to another said fixture.

7. The method of claim 1, further comprising locking said field shaper fixture into a horizontal position.

8. The method of claim 4, further comprising providing means for supporting a center conductor of said center conductor assembly while said center conductor fixture is positioned adjacent to one of said insulator fixtures.

* * * * *